June 30, 1942.   H. W. HUIJSER ET AL   2,288,281
PROCESS FOR SEPARATING MIXTURES OF CHEMICALLY RELATED SUBSTANCES
Filed May 29, 1939
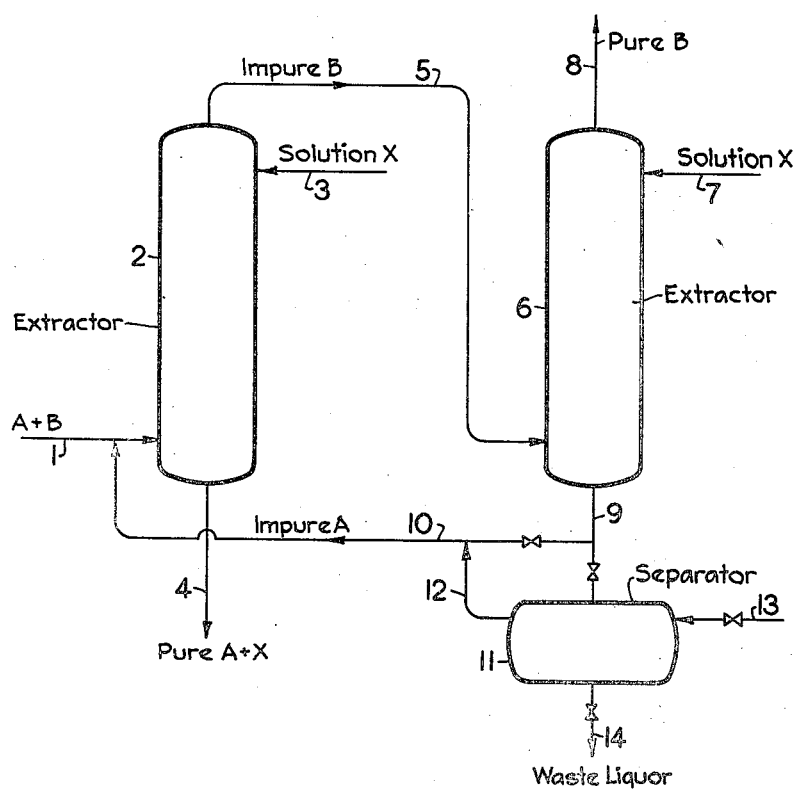
Inventors: Hendrik Willem Huijser
Albert Schaafsma
By Their Attorneys Patented June 30, 1942

2,288,281

UNITED STATES PATENT OFFICE 2,288,281

PROCESS FOR SEPARATING MIXTURES OF CHEMICALLY RELATED SUBSTANCES

Hendrik Willem Huijser and Albert Schaafsma, Amsterdam, Netherlands, assignors to Shell Development Company, San Francisco, Calif., a corporation of Delaware Application May 29, 1939, Serial No. 276,490
In the Netherlands June 10, 1938

8 Claims. (Cl. 260—593)

This invention relates to the separation of mixtures of substances which are chemically and/or physically related in such a way that their separation by conventional means, such as solvent extraction, distillation, etc., offers great difficulties. More particularly, it deals with a separation of such mixtures by solvent extraction in the presence of a controlled amount of a binding agent which has preferential affinity to one of the components in the mixtures to be separated.

Separation of complex mixtures of related compounds by solvent extraction is well known. In general, one of two methods is employed—either the mixture is treated in one or several stages with a solvent having preferential solvent power for at least one component of a mixture—or it is treated with two substantially non-miscible solvents, preferably by countercurrent methods, one of which solvents preferentially dissolves one portion, while the other solvent preferentially dissolves the other portion of the mixture. However, there are many instances in which these methods give insufficient separation unless an excessive number of stages is employed, an expedient which frequently raises the cost of the treatment to an extent entirely disproportionate to the value of the substances to be separated.

It has been found that frequently in such cases a separation of the mixture into components or groups of components A and B can be brought about by extraction in a reasonable number of stages, if such separation is carried out in the presence of a binding agent C capable of chemically reacting with the mixture and which has the property of reacting more readily with one component or group of components than with the other.

The chemical reaction involving the substance C should be one of converting a portion of the mixture to a compound which may be readily separated from the unreacted portion. Thus the reaction may be one of formation of salts from a mixture of acids or bases; or it may be one of the formation of addition compounds, double compounds, complex compounds or the like; or it may involve oxidation or reduction to compounds which can easily be reverted to the original compound.

The binding agent may consist either of a single substance or a mixture of substances. If not a liquid itself, it should be dissolved in a suitable solvent having good solvent power for the product of reaction between the agent and the reacted portion of the mixture.

As a general rule, both components A and B of the mixture are capable of reacting with the binding agent under the conditions of the extraction. Therefore, the amount of the agent C used in the extraction should be less than that which is necessary to bind all of the mixture to be separated. The most desirable amount is normally that which is equivalent or about equivalent to the amount of the component of the mixture which preferentially reacts with the agent. However, there may be considerable leeway in the amount of binding agent used depending upon the results desired. We usually prefer to use amounts not less than half of the equivalent of the more reactive portion and not more than the equivalent of the reactive plus half of the less reactive portion of the mixture, provided the binding agent reacts substantially completely with the more reactive portion of the mixture as is desired in order to effect a clean separation by the method of our invention. An amount of the agent smaller than is equivalent to the more reactive portion results in a yield of extract (i. e., product of reaction of the agent with the reactive portion) less than the theoretical. However, this extract is of greater purity than if the theoretical or greater yield were obtained by the use of larger amounts of reagent. Conversely, an amount of the agent greater than the above equivalent produces an extract of relatively low degree of purity in a yield greater than theoretical and simultaneously produces a residual raffinate of high purity in relatively small yields.

A requirement for the operation of our process is that all the components of the mixture existing during the extraction be in the liquid form. This may require elevated temperatures, the addition of solvents or a combination of these expedients. If solvents are used, it is, of course, desirable to choose selective solvents having strong preferential solvent powers for the reacted and unreacted portions of the mixture, respectively, as convenience may direct. Normally we prefer to employ two solvents substantially immiscible with each other, one solvent having preferential solvent power for the binding agent and the reacted portion, and the other being a preferential solvent for the original mixture, and more particularly, for the residual unreacted portion, i. e., the raffinate. These liquids are preferably passed in countercurrent to each other through a suitable contact zone which may consist of one or several conventional packed towers or a number of mixers and settlers. The mixture to be separated is advantageously introduced at a point intermediate between the ends of said contact zone. If desired, however, the mixture may be first dissolved in one of the two solvents. The liquid layers resulting from the extraction and comprising the separated components of the mixture are separately withdrawn from opposite ends of the extraction zone.

The binding agent may be introduced into the zone in solution of the solvent having the greater solvent power for this particular agent. This is especially advantageous if the agent is substantially insoluble in the other solvent. If desired, the agent may instead first be combined with the mixture to be separated, and the resulting combination may then be introduced into the reaction zone.

Recirculation of one or both of the separated components, according to the "backwash" or similar principles may be employed if desired. Moreover, the process may be carried out continuously or as a batch method, and the temperatures need not be uniform through the extraction zone.

If desired, a system may be employed in which the mixture is first extracted in the presence of an amount of reagent less than the equivalent required to bind the more reactive component, thereby producing reacted extract of high purity and a residual first raffinate of lesser purity still containing a portion of the more reactive component. This first raffinate may then be subjected to a second extraction in the presence of a binder in an amount somewhat greater than the equivalent of the more reactive component retained in this first raffinate to produce a highly purified second raffinate and an impure extract containing excess binder and a portion of the less reactive component of the original mixture. This second extract may be recombined with fresh mixture to be separated, if desired, after at least a portion of the binder contained in the second extract has been separated from the latter. In order that this system may operate as described, it is necessary that the amount of binder used in the first extraction be less than the equivalent of the reactive portion of the mixture to be separated, while the sum of the amounts of the binder in the first and second extractions be greater than this equivalent.

The last-mentioned process may be better understood from a description of the figure, which represents a schematic flow diagram illustrating the method of carrying out the separation of a mixture of two components A plus B, for example, two liquid ketones of different reactivities, A being more reactive than B toward a chemical binding agent dissolved in a solvent forming solution X, which may be, for example, an aqueous solution of sodium bisulfite. The unreacted ketones are substantially immiscible with solution X.

The mixture A+B is admitted through feed line 1 to the bottom of extractor 2 wherein it comes in contact with a portion of solution X, which enters the top of extractor 2 through line 3, and which contains an amount of chemical binding agent less than the theoretical equivalent required to react with the more reactive component A. The resulting reaction product, which consists of substantially pure A dissolved in X, is withdrawn from the bottom of extractor 2 through line 4 and can be decomposed in a suitable apparatus, not shown, to yield practically pure component A.

The residual unreacted mixture of component B along with some unreacted component A passes from the top of extractor 2 via line 5 to the bottom of extractor 6 wherein it is contacted with a second portion of solution X which is admitted to the top of extractor 6 via line 7. The quantity of second portion of X is more than that required to react with the residual unreacted component A, but less than the amount equivalent to the total residual mixture. All of A as well as a portion of B will now react and the unreacted pure component B, substantially free from contamination by component A, is withdrawn from the top of extractor 6 via line 8. From the bottom of extractor 6 the resulting mixture of reaction products is withdrawn via line 9. This mixture may be returned to feed line 1 via line 10. If desired, this mixture may be separated in separator 11 to produce a free mixture of components A and B, which are then returned to extractor 2 by way of lines 12 and 10. The decomposition may be effected by adding a suitable chemical to separator 11 through line 13. Resulting waste liquor is withdrawn through line 14.

In many cases, water may be employed as one of the extracting liquids, particularly if the binding agent is water-soluble, while the other liquid may be an organic solvent such as benzene, pentane, hexane, heptane, petroleum distillate; an alcohol, such as propyl, butyl, amyl alcohol, cyclohexanol, or a higher alcohol; an ether as ethyl, propyl, butyl, amyl, or a higher ether, dichlorethyl ether, dioxan; a glycol or glycol ether such as propylene glycol, butylene glycol, diethylene glycol, ethylene glycol mono or dialkyl ether, diethylene glycol ether, triethylene glycol ether, etc.; a ketone as acetone, methyl ethyl ketone, methyl propyl ketone, methyl butyl ketone, diethyl ketone, cyclohexanone, furfural; nitrogen-containing solvents as nitrobenzene, pyridine, piperidine, etc.

The amount of solvents used may vary considerably. In general, the solvent for the agent should be used in quantities sufficient to prevent formation of solid precipitates on the one hand and be small enough, on the other hand, not to interfere in the reaction between the agent and the reactive portion of the mixture by way of excessive dilution, hydrolysis or the like. Similar considerations may apply to the other solvent normally employed in amounts between about 32% to 1000% by volume of the original mixture to be separated.

Examples of mixtures of chemically related components which may be separated in accordance with our invention are, for example:

Mixtures of organic bases of varying basicities, such as mixtures of petroleum bases obtained in the treatment of mineral oil fractions, e. g., cracked distillates, with more or less dilute sulfuric acid;

Mixtures of organic acidic substances such as mixtures of phenols and thiophenols, or of phenols and naphthenic acids, or of isomeric alkyl phenols, or of naphthenic and sulfonic acids and the like;

Mixtures of isomeric ketones of aldehydes or both, having different capacities of forming double compounds with bisulfites;

Mixtures of various organic polar compounds capable of reacting with inorganic salts, etc.

When the chemical reaction between the reagent, and the more reactive portion of the mixture is one of salt formation, and water is used as a solvent for the agent, there is danger of incomplete reaction due to hydrolysis, unless at least one of the components of the salt used in the reaction is a strong acid or base. Therefore, when it is desired to separate mixtures of weak acids or bases, the reagent is preferably a strong base. such as an alkali metal hydroxide, or a strong acid such as sulfuric, hydrochloric acid, etc., respectively.

The following examples serve to illustrate our invention:

Example I

A mixture of phenols and thiophenols was obtained by extracting cracked distillate with an aqueous solution of caustic soda and acidifying the resulting extract to liberate organic acids. This mixture which contained 12% by weight of sulfur was subjected to an extraction treatment by feeding it into the middle of a vertical column filled with Raschig rings. For every 100 parts of the mixture of feed, 700 parts of ethyl ether were introduced into the bottom of the column and 120 parts of a 14% aqueous caustic soda solution were admitted to the top at a rate so that the ether and caustic soda solutions flowed in countercurrent through the column. The spent caustic soda solution withdrawn from the bottom yielded, upon acidification, an organic liquid containing 24.8% sulfur and consisting predominantly of thiophenols. The ether solution emerging from the top yielded a phenol mixture containing .2% sulfur.

Example II

Acid compounds recovered from crude mineral oil consisting mainly of a mixture of about 34% by weight of phenols and about 66% by weight of carboxylic acids, were fed into the middle stage of an extraction system consisting of five stages. On one side of the system 320 parts diisopropyl ether per 100 parts of the mixture were introduced, and on the other side 106 parts of a 10% NaOH solution were fed. On the ether-feed side was withdrawn an aqueous solution of sodium salts of the carboxylic acids substantially free from phenolates; and on the opposite side was obtained an etheric solution of phenols free from carboxylic acids.

Example III

A mixture of 44.3% by weight 2,4,6-trimethyl pyridine (collidine) and 55.7% by weight quinoline was fed into the fifth stage of an 8-stage extraction system. On the side of the first stage 450 ml. benzene were introduced for every 100 grams of the mixture; and on the other side of the 8-stage system 167 ml. of a 4.38 normal aqueous HCl solution were fed. On the benzene-feed side, an aqueous solution of the chloride of collidine containing only a few percent of quinoline salt was withdrawn. The collidine recovered therefrom was 94.6% pure.

One-half of this product was reintroduced into the system and was reextracted with fresh benzene. On the acid-feed side, a benzene solution of quinoline containing 5.2% by weight of collidine was recovered.

Example IV 100 parts by volume of a mixture obtained by dehydrogenation of secondary amyl alcohols and consisting of 77% by volume of pentanone-2 and 23% by volume pentanone-3 were introduced into the third stage of an extraction system consisting of eight stages. Into stage 1, 280 parts by volume pentane were introduced, and into stage 8, 760 parts by volume of a 1.982 molar aqueous sodium bisulfite solution were fed. The bisulfite layer recovered from the system yielded 165 parts of pentanone-2 98% pure.

We claim as our invention:

1. In the process of separating a mixture of ketones comprising components of relatively high and low reactivities toward bisulfites, the steps comprising countercurrently extracting said mixture with an aqueous solution of a bisulfite and an organic solvent for said ketones, which solvent is substantially immiscible with said aqueous solution, under conditions to form addition compounds of the bisulfite with the more reactive components only and to form two liquid layers, one comprising an aqueous solution of said addition compounds, and the other comprising said organic solvent containing unreacted ketones of relatively low reactivity and separating the layers.

2. In the process of separating a mixture of chemically related compounds comprising components of different chemical propensities, the steps comprising subjecting said mixture to a first treatment with an amount of a reagent having preferential affinity to one portion only of said mixture, said amount being less than that which is equivalent to the portion having preferential affinity, under conditions to react said reagent with components having preferential affinity, thereby producing a product of reaction, in the presence of a solvent for said product, which solvent is substantially immiscible with the unreacted portion of said mixture, to form two liquid layers, one comprising said product of reaction, and the other comprising a solution of unreacted components, separating the layers, subjecting the unreacted component layer to a second treatment with an additional amount of said reagent, the sum of said amounts of reagent being greater than the chemical equivalent of said portion of the mixture having preferential affinity, but smaller than the equivalent of the total mixture, under conditions to form additional products of reaction and to form a second pair of liquid layers, one comprising said additional product of reaction and the other comprising residual unreacted components, separating the second pair of layers, and combining said second layer of reaction product with fresh mixture of compounds to be separated.

3. In the process of separating a mixture of chemically related compounds comprising components of different chemical propensities, the steps comprising subjecting said mixture to a first treatment with an amount of a reagent having preferential affinity to one portion only of said mixture, said amount being less than that which is equivalent to the portion having preferential affinity, under conditions to react said reagent with components having preferential affinity, thereby producing a product of reaction, in the presence of a solvent for said product, which solvent is substantially immiscible with the unreacted portion of said mixture, to form two liquid layers, one comprising a solution of said product of reaction, and the other comprising unreacted components, separating the layers, subjecting the unreacted component-layer to a second treatment with an additional amount of said reagent, the sum of said amounts of reagent being greater than the chemical equivalent of said portion of the mixture having preferential affinity, but smaller than the equivalent of the total mixture, under conditions to form additional products of reaction, and to form a second pair of liquid layers, one comprising said additional product of reaction and the other comprising residual unreacted components, separating the second pair of layers, separating reagent from the second layer of reaction product, and combining the resulting mixture with fresh mixture of compounds to be separated.

4. In the process of separating a mixture of compounds selected from the group consisting of aldehydes and ketones comprising compounds of relatively high and low reactivities toward bisulfites the steps comprising extracting said mixture with an aqueous solution of a bisulfite and an organic solvent for said compounds which solvent is substantially immiscible with said aqueous solution, under conditions to form addition compounds of the bisulfite predominantly with the more reactive compounds and to form two liquid layers one comprising an aqueous solution of said addition compounds and the other comprising said organic solvent containing unreacted compounds of relatively low reactivity, and separating the layers.

5. In the process of separating a mixture of aldehydes comprising components of relatively high and low reactivities toward bisulfites, the steps comprising countercurrently extracting said mixture with an aqueous solution of a bisulfite and an organic solvent for said aldehydes, which solvent is substantially immiscible with said aqueous solution, under conditions to form addition compounds of the bisulfite with the more reactive components only and to form two liquid layers, one comprising an aqueous solution of said addition compounds, and the other comprising said organic solvent containing unreacted aldehydes of relatively low reactivity, and separating the layers.

6. In the process of separating a mixture of compounds selected from the group consisting of aldehydes and ketones comprising compounds of relatively high and low reactivities towards bisulfites, the steps comprising subjecting said mixture to a first treatment with an amount of aqueous bisulfite having preferential affinity to one portion only of said mixture, said amount being less than that which is equivalent to the portion having preferential affinity, under conditions to react said bisulfite with said mixture, thereby producing a product of reaction, in the presence of a solvent for said product, which solvent is substantially immiscible with the unreacted portion of said mixture, to form two liquid layers one comprising a solution of said product of reaction and the other comprising unreacted compounds, separating the layers, subjecting the unreacted compound layer to a second treatment with an additional amount of said aqueous bisulfite, the sum of said amounts of aqueous bisulfite being greater than the chemical equivalent of said portion of the mixture having preferential affinity but smaller than the equivalent of the total mixture, under conditions to form additional products of reaction and to form a second pair of liquid layers one comprising said additional product of reaction and the other comprising residual unreacted compounds, separating the second pair of layers and combining said second layer of reaction product with fresh mixture of compounds to be separated.

7. In the process of separating a mixture containing aldehydes and ketones comprising components of relatively high and low reactivities towards bisulfites, the steps comprising subjecting said mixture to a first treatment with an amount of bisulfite having preferential affinity for one portion only of said mixture, said amount being less than that which is equivalent to the portion having preferential affinity, under conditions to react said bisulfite with said mixture, thereby producing a product of reaction, in the presence of a solvent for said product, which solvent is substantially immiscible with the unreacted portion of said mixture, to form two liquid layers one comprising a solution of said product of reaction and the other comprising unreacted components, separating the layers, subjecting the unreacted component layer to a second treatment with an additional amount of said bisulfite, the sum of said amounts of bisulfite being greater than the chemical equivalent of said portion of the mixture having preferential affinity but smaller than the equivalent of the total mixture, under conditions to form additional products of reaction and to form a second pair of liquid layers one comprising said additional product of reaction and the other comprising residual unreacted components, separating the second pair of layers, separating the bisulfite from the second layer of reaction product and combining the resulting mixture with fresh mixture of compounds to be separated.

8. In the process of separating a mixture of pentanone-2 and pentanone-3 the steps comprising extracting said mixture with an aqueous solution of a bisulfite and an organic solvent for said pentanones which solvent is substantially immiscible with said aqueous solution, under conditions to form addition compounds of the bisulfite with the more reactive pentanone-2 only and to form two liquid layers one comprising an aqueous solution of said addition compound the other comprising said organic solvent containing the unreacted pentanone-3 and separating the layers.

HENDRIK WILLEM HUIJSER.
ALBERT SCHAAFSMA.